US012784312B2

(12) United States Patent
Sajib et al.

(10) Patent No.: US 12,784,312 B2
(45) Date of Patent: Nov. 3, 2026

(54) IMAGE QUALITY IMPROVEMENT IN MAGNETIC RESONANCE IMAGING USING MACHINE LEARNING RECONSTRUCTION

(71) Applicant: CANON KABUSHIKI KAISHA, Tokyo (JP)

(72) Inventors: Saurav Zaman Khan Sajib, Vernon Hills, IL (US); Samir Dev Sharma, Vernon Hills, IL (US); Sampada Bhave, Vernon Hills, IL (US)

(73) Assignee: CANON KABUSHIKI KAISHA, Tokyo (JP)

( * ) Notice: Subject to any disclaimer, the term of this patent is extended or adjusted under 35 U.S.C. 154(b) by 176 days.

(21) Appl. No.: 18/922,723

(22) Filed: Oct. 22, 2024

(65) Prior Publication Data

US 2026/0112094 A1 Apr. 23, 2026

(51) Int. Cl.

*G06T 12/20* (2026.01)
*G06T 5/50* (2006.01)
*G06T 5/60* (2024.01)
*G06T 5/70* (2024.01)

(52) U.S. Cl.

CPC ................ *G06T 12/20* (2026.01); *G06T 5/50* (2013.01); *G06T 5/60* (2024.01); *G06T 5/70* (2024.01); *G06T 2207/10088* (2013.01); *G06T 2207/20084* (2013.01); *G06T 2211/441* (2023.08)

(58) Field of Classification Search

CPC .... G06T 5/50; G06T 5/60; G06T 5/70; G06T 12/20; G06T 2207/10088; G06T 2207/20084; G06T 2211/441

See application file for complete search history.

(56) References Cited

U.S. PATENT DOCUMENTS

| | | | | |
|---|---|---|---|---|
| 11,175,365 B2 * | 11/2021 | Hardy | ................ | G01R 33/5611 |
| 12,535,547 B2 * | 1/2026 | Zhang | ................ | G01R 33/5608 |
| 2021/0166445 A1 | 6/2021 | Wang et al. | | |
| 2024/0029323 A1 | 1/2024 | Nickel et al. | | |
| 2024/0070936 A1 | 2/2024 | Cadiou et al. | | |
| 2024/0095978 A1 | 3/2024 | Sun et al. | | |

(Continued)

OTHER PUBLICATIONS

Jun et al., "Joint Deep Model-based MR Image and Coil Sensitivity Reconstruction Network (Joint-ICNet) for Fast MRI", Computer Vision Foundation, IEEE Xplore, 2021, 10 pages.

*Primary Examiner* — Michael B. Pierorazio

(74) *Attorney, Agent, or Firm* — Maier & Maier, PLLC

(57) ABSTRACT

A method, system, processing circuitry, and computer program product for processing images, including, by performing the steps of: receiving an input image generated using a first set of acquired k-space data including undersampled k-space data; dealiasing the input image to produce a dealiased image; modifying the dealiased image using a first data consistency layer to increase a first data consistency between the dealiased image and an acquired data source thereby producing a first increased data consistency image; and modifying, using a second data consistency layer that receives the undersampled k-space data, the first increased data consistency image to produce a second increased data consistency image in which the second increased data consistency image is constrained to be based on at least a portion of the undersampled k-space data, where the first and second data consistency layers are different from each other.

18 Claims, 12 Drawing Sheets

(56) References Cited

U.S. PATENT DOCUMENTS

| | | | |
|---|---|---|---|
| 2024/0135604 | A1 | 4/2024 | An et al. |
| 2024/0219502 | A1 | 7/2024 | Haji-Valizadeh et al. |
| 2024/0230810 | A1 | 7/2024 | Shih et al. |
| 2025/0389800 | A1* | 12/2025 | Chatterjee .......... G01R 33/5608 |
| 2026/0057476 | A1* | 2/2026 | Liu ....................... G06T 3/4046 |

* cited by examiner

IMAGE QUALITY IMPROVEMENT IN MAGNETIC RESONANCE IMAGING USING MACHINE LEARNING RECONSTRUCTION

BACKGROUND OF THE INVENTION

Field of the Invention

A method, system, processing circuitry, and computer program product for improving image quality in Magnetic Resonance Imaging (MRI) using machine learning reconstruction, and, in one embodiment, to a method, system, processing circuitry, and computer program product for combining k-space data replacement and image regularization in order to enhance image quality.

Discussion of the Background

Known machine learning reconstruction (MLR) methods reconstruct images (e.g., MRI images) from undersampled k-space data. In a known MLR method, image data is received by a neural network (NN) whose output is then applied to a data consistency (DC) layer. The neural network reduces aliasing artifacts that result from the undersampling of the k-space data. The DC layer facilitates the reconstructed image being consistent with the acquired k-space data. Known information about the image formation (e.g. Fourier transform, coil sensitivity maps) process can be included in the data consistency processing.

In one embodiment, a reconstructed image I is given by:

$$I = \lambda\|\mathcal{N}_w(x)\|^2 + \underset{x}{\operatorname{argmin}}\|A(x) - b\|_2^2$$

where the first term ($\lambda\|\mathcal{N}_w(x)\|^2$) represents a regularization term to be achieved by a neural network, and the second term $$\left(\underset{x}{\operatorname{argmin}}\|A(x) - b\|_2^2\right)$$

represents a data consistency constraint. In such an embodiment, regularization weight λ and the regularizer $\mathcal{N}_w$ are learned from the network training, A is the forward operator, and b is the measured data.

FIG. 1 illustrates an architecture in which "N" cascades (or unrolls) are used that alternate processing on an input image between a neural network and a data consistency layer. A regularization value (λ) is used to weight the relative contribution of the NN layer and the DC layer in each cascade. The DC layer can impose data consistency using a gradient descent approach, by proximal mapping (PM) using the conjugate-gradient (CG) algorithm, or by using variable-splitting methods. All of these methods use a 'soft data consistency' (soft DC) in that they do not directly constrain any portion of the resulting image to be made the same as any actually acquired k-space data. The soft DC methods may receive additional inputs besides just the image data. For example, they may receive coil sensitivity maps from a separate scan or generated from an auto-calibration signal (ACS) region of the corresponding k-space data. The soft DC methods support parallel imaging and arbitrary k-space sampling pattern.

MLR methods that use soft DC can result in image artifacts due to imperfect models (e.g., errors in coil sensitivity maps), errors in NN output, or an improper selection of the regularization value (1). Furthermore, as both the soft DC layer and the NN layer modify the values of the acquired k-space lines, the operations of those layers can introduce artifacts such as image blurring and noise-like artifacts due to unresolved aliasing.

Data consistency also can be "hard data consistency" (hard DC) in which estimated k-space values at the acquired k-space locations are replaced with the acquired k-space values. Some known methods that employ hard DC are implemented for single-coil data and do not include hard DC processes in network training. Other hard DC methods can be implemented for multi-coil data and include the DC layer in the network training; however, those methods both are not combined with soft DC layer and do not take advantage of the knowledge of coil sensitivity maps.

Known MLR methods that use hard DC may either not take advantage of the knowledge of coil sensitivity maps for multi-coil data or are implemented for single-coil data and are not included in network training. The lack of generalizability to multi-coil data may limit the clinical use of MLR based on hard DC processing alone Moreover, not including the hard DC processing in training may produce suboptimal IQ.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present disclosure is related to a method, system, and non-transitory computer-readable storage medium storing computer-readable instructions for providing improved image quality in Magnetic Resonance Imaging (MRI) using machine learning reconstruction in which k-space data replacement is combined with image regularization.

In one embodiment, it can be appreciated that the present disclosure can be viewed as a system. While the present exemplary embodiments will refer to an MRI apparatus, it can be appreciated that other system configurations can use other medical imaging apparatuses (e.g., CT systems and combined MRI/CT systems).

Figure 1:
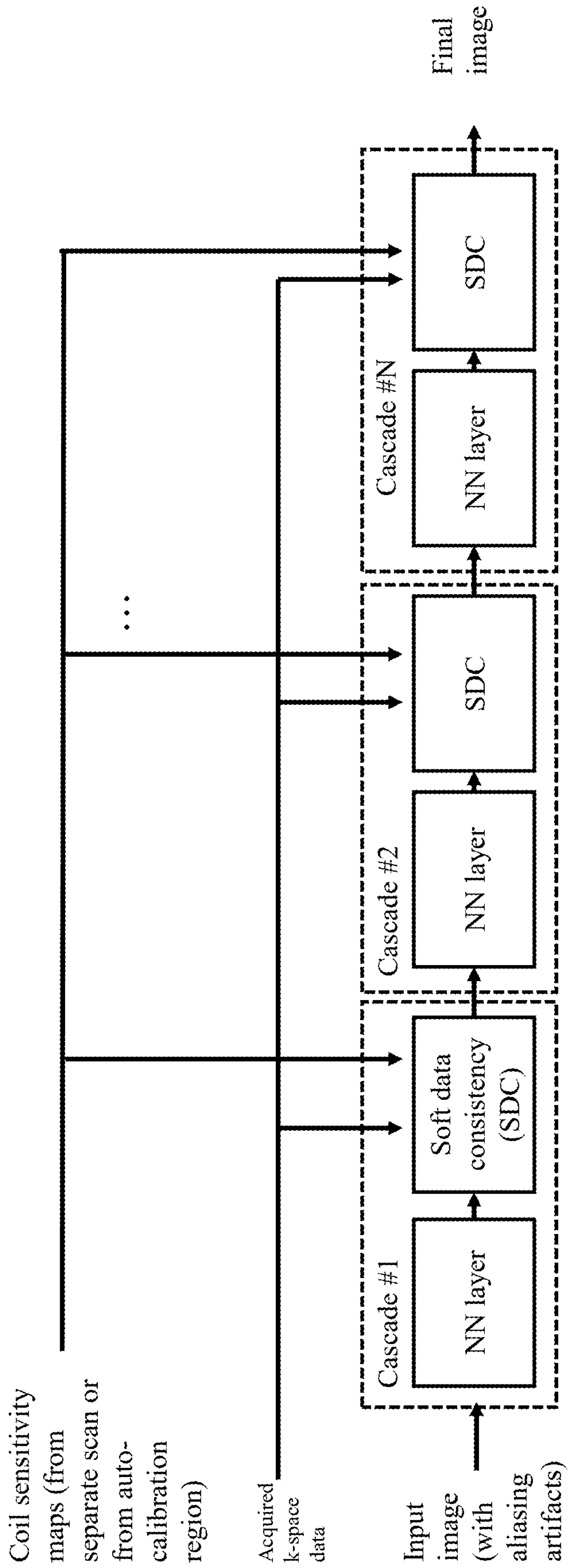
FIG. 1 is a block diagram showing a known image generation architecture that utilizes "N" cascades (or unrolls) that alternate processing on an input image between a neural network and a soft data consistency layer.
Figure 2:
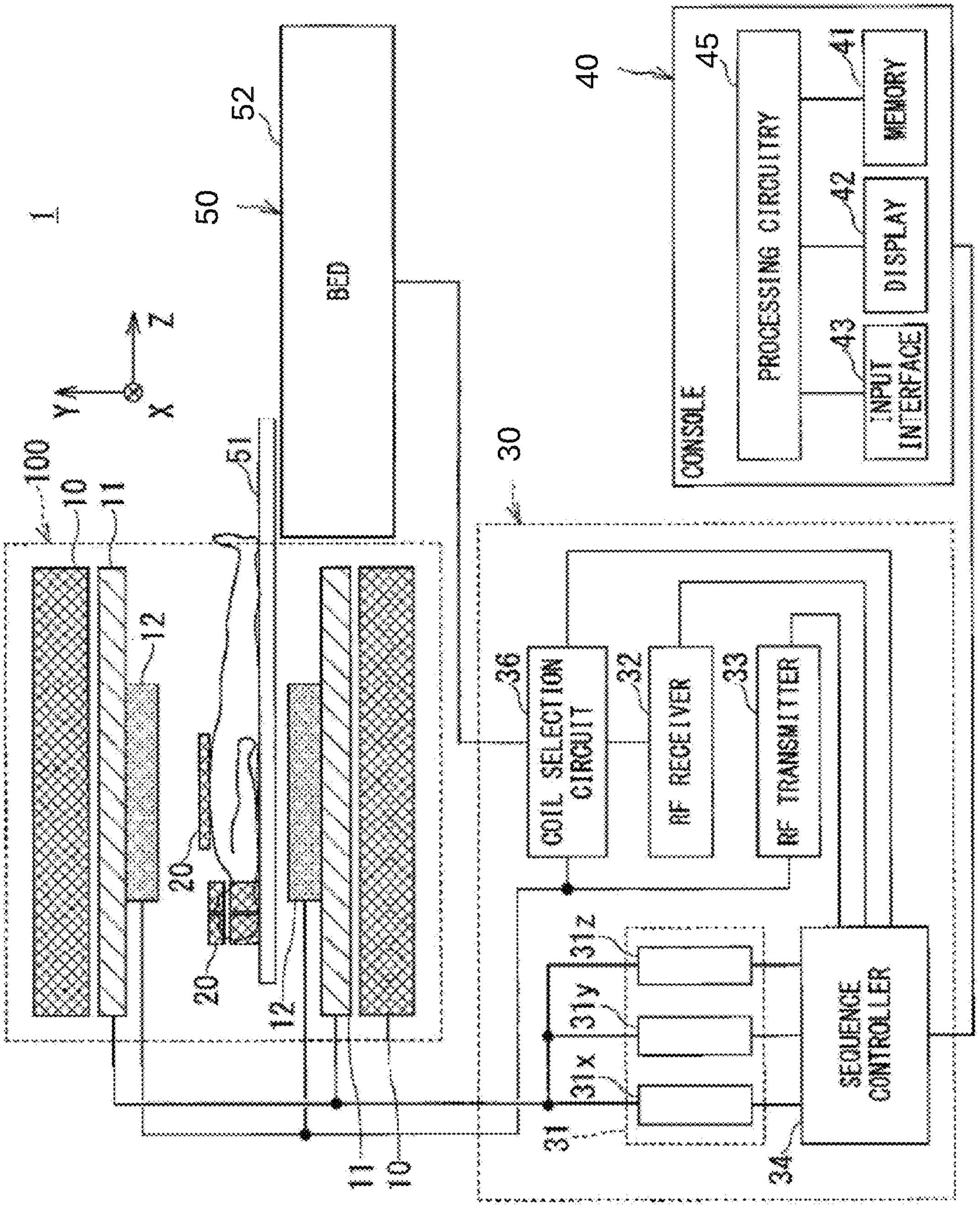
FIG. 2 is a schematic illustration of an MRI apparatus.

Referring now to the drawings, FIG. 2 is a block diagram illustrating overall configuration of an MRI apparatus 1. The MRI apparatus 1 includes a gantry 100, a control cabinet 30, a console 40, a bed 50, and radio frequency (RF) coils 20. The gantry 100, the control cabinet 30, and the bed 50 constitute a scanner, i.e., an imaging unit.

The gantry 100 includes a static magnetic field magnet 10, a gradient coil 11, and a whole body (WB) coil 12, and these components are housed in a cylindrical housing. The bed 50 includes a bed body 52 and a table 51.

The control cabinet 30 includes three gradient coil power supplies 31 (31 x for an X-axis, 31 y for a Y-axis, and 31 z for a Z-axis), a coil selection circuit 36, an RF receiver 32, an RF transmitter 33, and a sequence controller 34.

The console 40 includes processing circuitry 45, a memory 41, a display 42, and an input interface 43. The console 40 functions as a host computer.

The static magnetic field magnet 10 of the gantry 100 is substantially in the form of a cylinder and generates a static magnetic field inside a bore into which an object such as a patient is transported. The bore is a space inside the cylindrical structure of the gantry 100. The static magnetic field magnet 10 includes a superconducting coil inside, and the superconducting coil is cooled down to an extremely low temperature by liquid helium. The static magnetic field magnet 10 generates a static magnetic field by supplying the superconducting coil with an electric current provided from a static magnetic field power supply (not shown) in an excitation mode. Afterward, the static magnetic field magnet 10 shifts to a permanent current mode, and the static magnetic field power supply is separated. Once it enters the permanent current mode, the static magnetic field magnet 10 continues to generate a strong static magnetic field for a long time, for example, over one year. In FIG. 2, the black circle on the chest of the object indicates the magnetic field center.

The gradient coil 11 is also substantially in the form of a cylinder and is fixed to the inside of the static magnetic field magnet 10. This gradient coil 11 applies gradient magnetic fields (for example, gradient pulses) to the object in the respective directions of the X-axis, the Y-axis, and the Z-axis, by using electric currents supplied from the gradient coil power supplies 31 x, 31 y, and 31 z.

The bed body 52 of the bed 50 can move the table 51 in the vertical direction and in the horizontal direction. The bed body 52 moves the table 51 with an object placed thereon to a predetermined height before imaging. Afterward, when the object is imaged, the bed body 52 moves the table 51 in the horizontal direction so as to move the object to the inside of the bore.

The WB body coil 12 is shaped substantially in the form of a cylinder so as to surround the object and is fixed to the inside of the gradient coil 11. The WB coil 12 applies RF pulses transmitted from the RF transmitter 33 to the object. Further, the WB coil 12 receives magnetic resonance signals, i.e., MR signals emitted from the object due to excitation of hydrogen nuclei.

The MRI apparatus 1 may include the RF coils 20 as shown in FIG. 2 in addition to the WB coil 12. Each of the RF coils 20 is a coil placed close to the body surface of the object. There are various types for the RF coils 20. For example, as the types of the RF coils 20, as shown in FIG. 2, there are a body coil attached to the chest, abdomen, or legs of the object and a spine coil attached to the back side of the object. As another type of the RF coils 20, for example, there is a head coil for imaging the head of the object. Although most of the RF coils 20 are coils dedicated for reception, some of the RF coils 20 such as the head coil are a type that performs both transmission and reception. The RF coils 20 are configured to be attachable to and detachable from the table 51 via a cable.

The RF transmitter 33 generates each RF pulse on the basis of an instruction from the sequence controller 34. The generated RF pulse is transmitted to the WB coil 12 and applied to the object. An MR signal is generated from the object by the application of one or plural RF pulses. Each MR signal is received by the RF coils 20 or the WB coil 12.

The MR signals received by the RF coils 20 are transmitted to the coil selection circuit 36 via cables provided on the table 51 and the bed body 52. The MR signals received by the WB coil 12 are also transmitted to the coil selection circuit 36.

The coil selection circuit 36 selects MR signals outputted from each RF coil 20 or MR signals outputted from the WB coil depending on a control signal outputted from the sequence controller 34 or the console 40.

The selected MR signals are outputted to the RF receiver 32. The RF receiver 32 performs analog to digital (AD) conversion on the MR signals, and outputs the converted signals to the sequence controller 34. The digitized MR signals are referred to as raw data in some cases. The AD conversion may be performed inside each RF coil 20 or inside the coil selection circuit 36.

The sequence controller 34 performs a scan of the object by driving the gradient coil power supplies 31, the RF transmitter 33, and the RF receiver 32 under the control of the console 40. When the sequence controller 34 receives raw data from the RF receiver 32 by performing the scan, the sequence controller 34 transmits the received raw data to the console 40.

The sequence controller 34 includes processing circuitry (not shown). This processing circuitry is configured as, for example, a processor for executing predetermined programs or configured as hardware such as a field programmable gate array (FPGA) or an application specific integrated circuit (ASIC).

The console 40 includes the memory 41, the display 42, the input interface 43, and the processing circuitry 45 as described above.

The memory 41 is a recording medium including a read-only memory (ROM) and a random access memory (RAM) in addition to an external memory device such as a hard disk drive (HDD) and an optical disc device. The memory 41 stores various programs executed by a processor of the processing circuitry 45 as well as various types of data and information.

The input interface 43 includes various devices for an operator to input various types of information and data, and is configured of a mouse, a keyboard, a trackball, and/or a touch panel, for example.

The display 42 is a display device such as a liquid crystal display panel, a plasma display panel, and an organic EL panel.

The processing circuitry 45 is a circuit equipped with a central processing unit (CPU) and/or a special-purpose or general-purpose processor, for example. The processor implements various functions described below (e.g. method 300) by executing the programs stored in the memory 41. The processing circuitry 45 may be configured as hardware such as an FPGA and an ASIC. The various functions described below can also be implemented by such hardware. Additionally, the processing circuitry 45 can implement the various functions by combining hardware processing and software processing based on its processor and programs.

Figure 3:
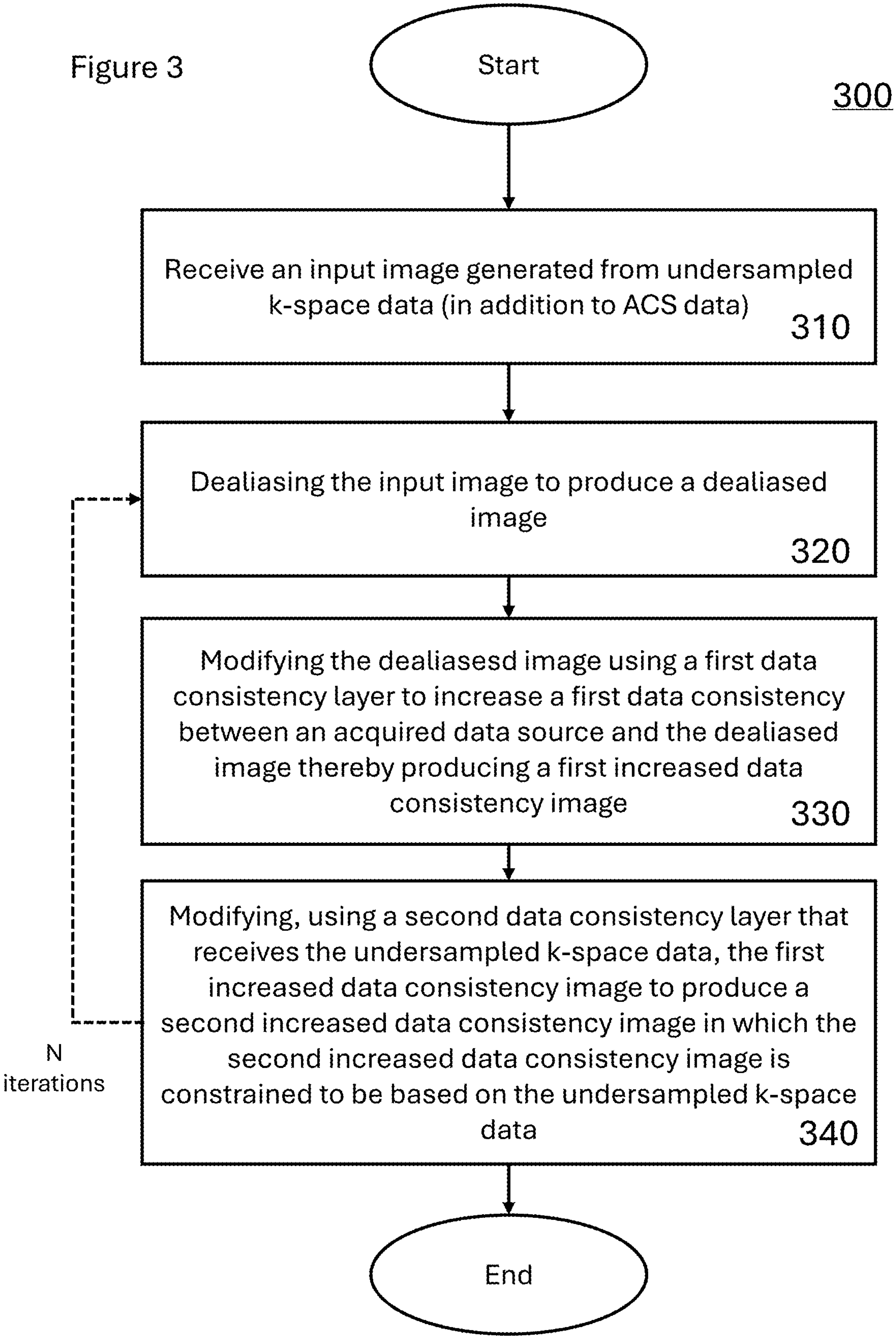
FIG. 3 is a flowchart showing a generalized process of generating an MRI image with improved image quality using a combination of two kinds of data consistency layers (e.g., a soft data consistency layer and a hard data consistency layer)

FIG. 3 is a flowchart showing a generalized process as described herein. In method 300, the process begins in step 310 by receiving an input image generated using a first set of acquired k-space data including auto-calibration signal (ACS) data and undersampled k-space data outside of the ACS region. Control then passes to step 320 in which the input image is dealiased (or unaliased) (e.g., using a neural network or a model-based method, such as a total-variation transform or a wavelet transform) to produce a dealiased image. In step 330, the dealiased image is modified using a first data consistency layer to increase a first data consistency between an acquired data source and the dealiased image thereby producing a first increased data consistency image. The acquired data source may include, but is not limited to, at least one of (1) a portion of the first set of acquired k-space data, (2) a transformation (or other function) of at least a portion of the first set of acquired k-space data or (3) an artifact corrected first set of acquired k-space data.

Figure 4A:
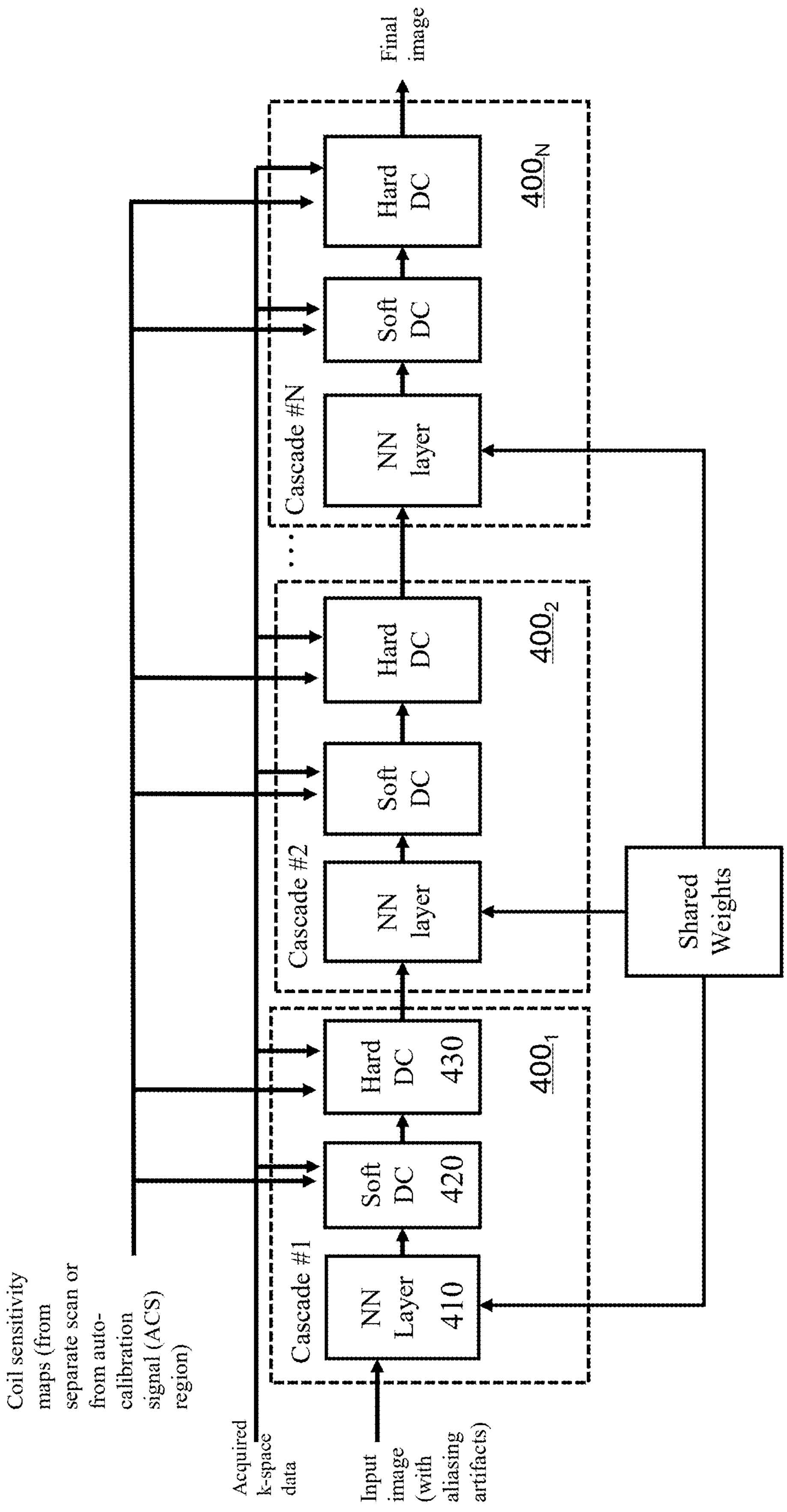
FIG. 4A is a block diagram illustrating N cascaded sets of layers (including neural networks with shared weights) that perform the method of FIG. 3.
Figure 4B:
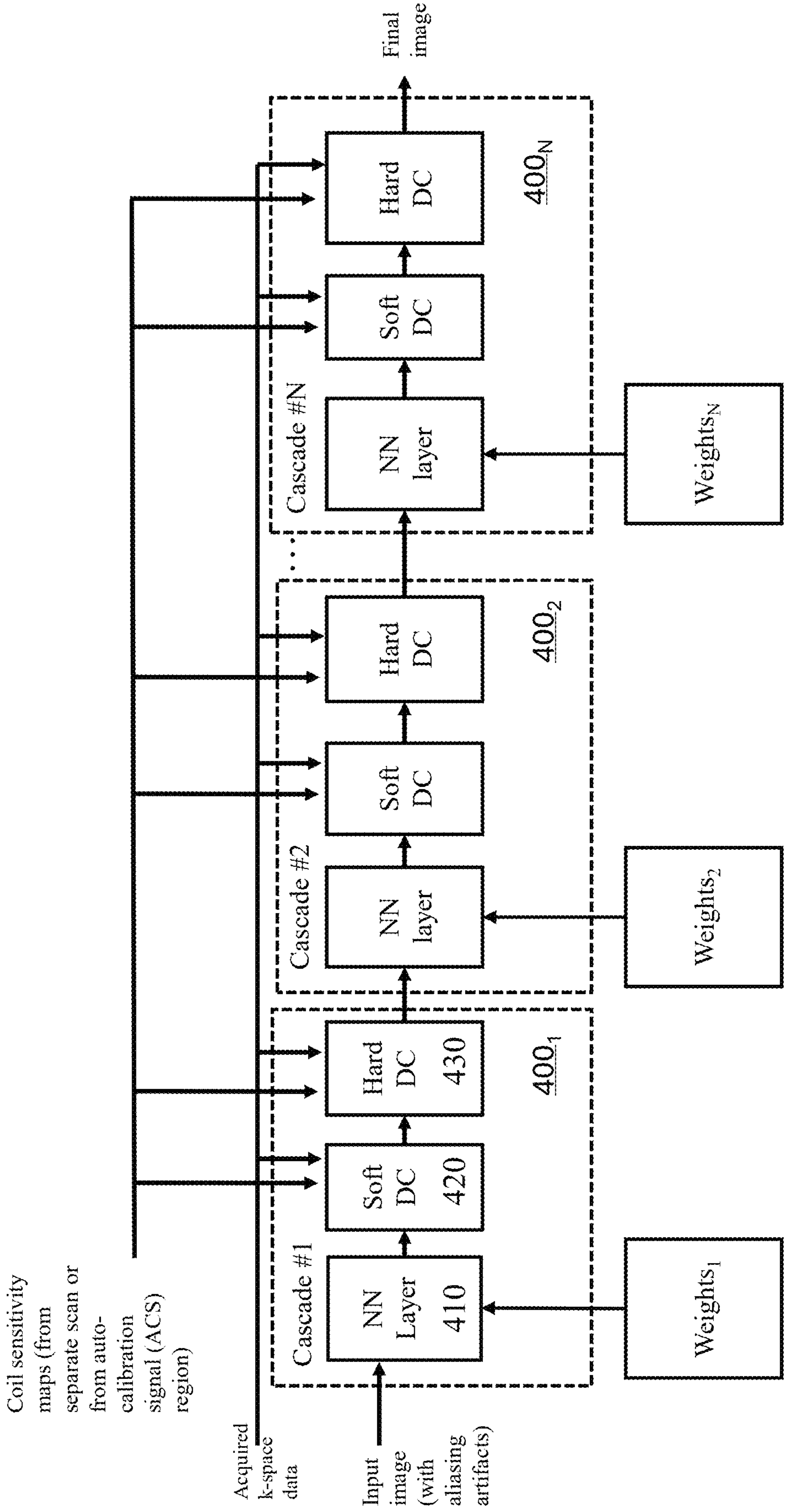
FIG. 4B is a block diagram illustrating N cascaded sets of layers (including neural networks with individual weights) that perform the method of FIG. 3.

Lastly, in step 340, a second data consistency layer receives the undersampled k-space data and modifies the first increased data consistency image to produce a second increased data consistency image in which the second increased data consistency image is constrained to be based on the undersampled k-space data. The process can be performed for "N" iterations that each dealias the current version of the image and then make the currently dealiased image more consistent with acquired k-space data. The regularization weight and regularizer are learned in the network training stage. The reconstruction network includes a Neural Network layer, followed by the soft and hard DC layers, as shown in FIGS. 4A and 4B. In network training, a U-Net and a conjugate gradient method are used for the NN layer and soft DC layer, respectively. The fully sampled k-space data is retrospectively undersampled (e.g., at a 4×-5× acceleration factor) to generate the network input (image with the aliasing artifact). The corresponding target image (artifact-free) used in training is generated from the fully sampled k-space data. During the training stage, the retrospectively undersampled k-space data also is input into the hard DC layer. In at least one embodiment, the network is trained with imaging area specific datasets (e.g., a brain dataset or a knee dataset) with various contrasts (T1, T2, PD). Alternatively, regularization weight and regularizer can be learned in the network training stage in an acceleration specific manner such that a network trained on n-x accelerated data is used when processing n-x accelerated data, where n is any positive real number greater than one.

FIG. 4A is a block diagram illustrating N cascaded sets of layers that perform the method 300 described above, wherein N is larger than one and may include values such as 4 or 8. Alternatively, there may be a single set of layers that performs the method 300 described above.

As shown in FIG. 4A, an input image is received at the first cascade 4001. The size of the image can be square or rectangular, and the image may be either complete by itself or broken into repeated slices. For example, an input image slice may be 128×128, 256×256, 512×512, 1024×1024, or any variation thereon (e.g., 256×512 or 128×1024). The input image has been generated using a first set of acquired k-space data including auto-calibration signal (ACS) data and undersampled k-space data outside of the ACS region. The input image is received as an input to a dealiasing function (e.g., neural network) 410 of the first cascade 4001. The dealiasing function 410 will be described herein as the neural network 410. The neural network 410 then dealiases the input image to produce a dealiased image. The dealiased image is modified using a first data consistency layer 420 (e.g., a soft DC layer) to increase a first data consistency between an acquired data source and the dealiased image thereby producing a first increased data consistency image. As noted above, the acquired data source may include, but is not limited to, a coil sensitivity map from the auto-calibration signal (ACS) region of the first set of acquired k-space data or from a separate scan producing a second set of acquired k-space data different from the first set of acquired k-space data. As used herein to describe applicant's embodiments, a "hard data consistency" (hard DC) layer means a processing layer in which one, plural or all corresponding original acquired k-space values replace their corresponding estimated k-space values (output from an earlier layer) at the acquired k-space locations. Accordingly, a hard DC layer is therefore a k-space data consistency layer that replaces one, plural, or as many k-space values as exist in the original acquired k-space data. All other data consistency processes which operate in the image domain are to be considered "soft data consistencies" (soft DCs). Data consistency processes that operate on k-space data and image data are considered blended data consistency processes.

A second data consistency layer 430 (e.g., a hard DC layer) receives at least a portion of the undersampled k-space data and modifies the first increased data consistency image to produce a second increased data consistency image in which the second increased data consistency image is constrained to utilize at least a portion of the undersampled k-space data. The second increased data consistency image is output from the first cascade 4001 and input to the second cascade 4002. The processing is repeated in each of the "N" cascades until a final image is produced. In the illustrated embodiment of FIG. 4A, each of the neural networks in the N cascaded sets of layers has the same set of weights. Alternatively, as shown in FIG. 4B, each of the neural networks in the N cascaded sets of layers may have a cascade-specific set of weights (some of which may be the same, and some of which may be different).

Each of the neural networks may be implemented as the same type of neural network or a different kind of neural network. For example, any one of the neural networks may be implemented as a residual network, a U-net, a down-up Unet (DUNET) as described by Hammernik et al., *Systematic evaluation of iterative deep neural networks for fast parallel MRI reconstruction with sensitivity-weighted coil combination*, Magn. Reson. Med. 86:1859-1872 (2021), the contents of which are incorporated herein by reference.

In a first embodiment of the second data consistency layer 430, the following processing is performed: (1) apply a forward operator (e.g., including, but not limited to, a coil sensitivity map followed by a Fourier transform) to the first increased data consistency image to transform the soft DC layer output to multi-coil, k-space data, (2) receive at least one of (1) a portion of the first set of acquired k-space data, (2) a transformation (or other function) of at least a portion of the first set of acquired k-space data or (3) an artifact corrected first set of acquired k-space data in the first set of acquired k-space data, (3) replace the estimated k-space values with the acquired k-space values at all or at least some of the acquired k-space points; and (4) apply the adjoint operator (including an inverse Fourier transform followed by complex conjugate of coil sensitivity map) to the modified k-space data to return to the coil-combined image.

Mathematically, these steps in the first embodiment can be summarized as follows:

$$k^i_{softDC} = A(x_{softDC}), \tag{1}$$

where $x_{softDC}$ is the coil combined image after the soft DC layer and A is the MRI forward operator;

$$k^i_{hardDC} = \mathcal{M}\, k^i_{acq} + (1 - \mathcal{M})k^i_{softDC}, \tag{2}$$

where $\mathcal{M}$ is undersampling mask (which utilizes a binary function that equals 1 at sampled locations and 0 otherwise); and $$x_{hardDC} = A^H\left(k^i_{hardDC}\right), \tag{3}$$

where $A^H$ is the MRI adjoint operator.

In a second, alternate embodiment, the second data consistency layer 430 can be implemented as a semi-hard data consistency layer. In the second embodiment, the binary function of the second step is replaced by an analog blending step in which:

$$k^i_{hardDC} = \mathcal{M}\left(\alpha k^i_{acq} + (1-\alpha)\, k^i_{softDC}\right) + (1 - \mathcal{M})\, k^i_{softDC}\ 0 \le \alpha \le 1,$$

where α is a blending ratio and $$k^i_{acq}$$

is the acquired k-space data of the $i^{th}$ coil. In such an embodiment, the blending ratio can be (1) fixed, (2) set as a learnable parameter, (3) set based on a type of imagine protocol being performed, and (4) set based on a user input.

Figure 5:
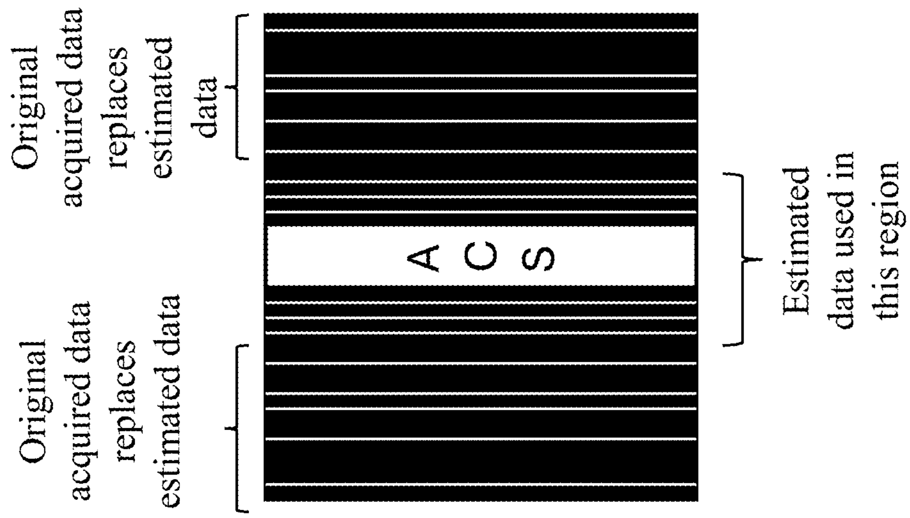
FIG. 5 is a schematic illustration of acquired and unacquired k-space lines which can be selectively used to replace or not replace estimated k-space data output from a soft data consistency layer.

In one implementation of the hard DC layer, the estimated k-space output from the soft DC layer is replaced with the acquired k-space in only a subset of the acquired locations. FIG. 5 is a schematic illustration of acquired k-space lines (in white) and unacquired k-space lines (in black). The acquired k-space lines can be selectively used to replace or not replace estimated k-space data output from a soft data consistency layer. For example, as shown in FIG. 5, partial replacement based on frequency of the corresponding line is used. Replacing only outer (higher frequency) k-space lines (as shown in FIG. 5) can improve image sharpness as the edge information is contained in high frequency samples. Alternatively, if the acquired k-space is corrupted with motion, replacing the k-space for only the uncorrupted locations can reduce motion artifacts in the final image.

Figure 6A:
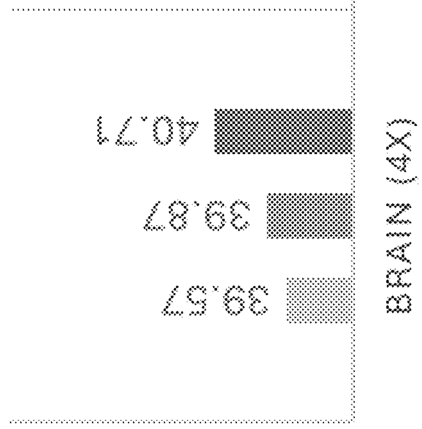
FIG. 6A is a graph showing increasing Peak Signal to Noise Ratios (PSNRs) for an imaged brain in which a machine-learning reconstruction using joint soft and hard data consistency (DC) layers in training and inference has a best PSNR.
Figure 6B:
FIG. 6B is a graph showing increasing Peak Signal to Noise Ratios (PSNRs) for an imaged knee in which a machine-learning reconstruction using joint soft and hard DC layers in training and inference has a best PSNR.

As shown in FIG. 6A, for a 4× acceleration rate (i.e., an undersampled dataset having $\frac{1}{4}^{th}$ the data of a fully sampled dataset), the Peak Signal to Noise Ratio (PSNR) for an imaged brain (having a total of 752 slices) increases from 39.57 for a MLR with soft DC only, to 39.87 for a MLR with soft DC in training and joint soft and hard DC at inference, to a best ratio of 40.71 for a MLR with joint soft and hard DC in training and inference. As shown in FIG. 6B, the PSNR for an imaged knee (having a total of 558 slices) increases from 42.55 for a MLR with soft DC only, to 42.78 for a MLR with soft DC in training and joint soft and hard DC at inference, to a best ratio of 43.5 for a MLR with joint soft and hard DC in training and inference.

Figure 7A:
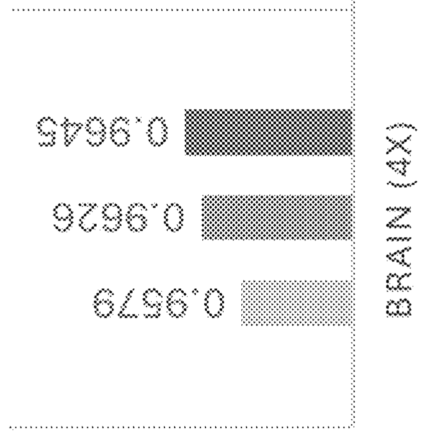
FIGS. 7A and 7B are graphs showing increasing Structural Similarity Indexes (SSIMs) for an imaged brain and knee, respectively, in which machine-learning reconstructions using joint soft and hard DC layers in training and inference have the respective best SSIMs.
Figure 7B:
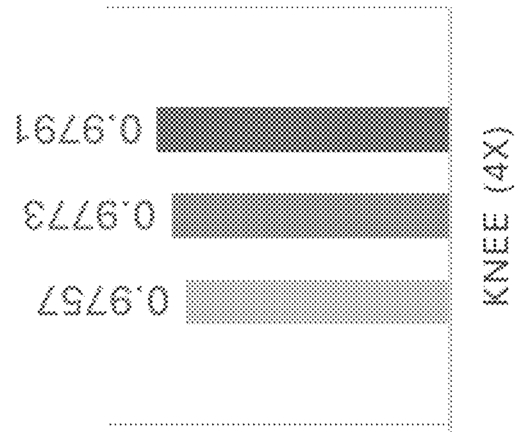

Similarly, as shown in FIG. 7A, the Structural Similarity Index Measure (SSIM) for an imaged brain (having a total of 752 slices) increases from 0.9579 for a MLR with soft DC only, to 0.9626 for a MLR with soft DC in training and joint soft and hard DC at inference, to a best index of 0.9645 for a MLR with joint soft and hard DC in training and inference. As shown in FIG. 7B, the SSIM for an imaged knee (having a total of 558 slices) increases from 0.9757 for a MLR with soft DC only, to 0.9773 for a MLR with soft DC in training and joint soft and hard DC at inference, to a best index of 0.9645 for a MLR with joint soft and hard DC in training and inference. Thus, the MLRs according to the teachings herein can provide both an increased PSNR and an increased SSIM compared to known methodologies.

Figure 8D:
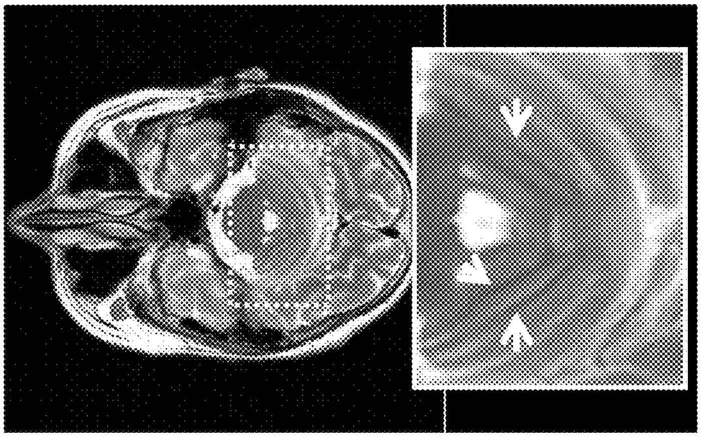
FIG. 8D is a processed image and its enlargement based on the first slice of the MRI brain scan of FIG. 8A in which an MLR having 8 cascaded layers (a) is trained using soft and hard DC layers and (b) processes the initial reference image using the soft and hard DC layers, thereby resulting in improved image quality as compared to FIGS. 8B and 8C.
Figure 8C:
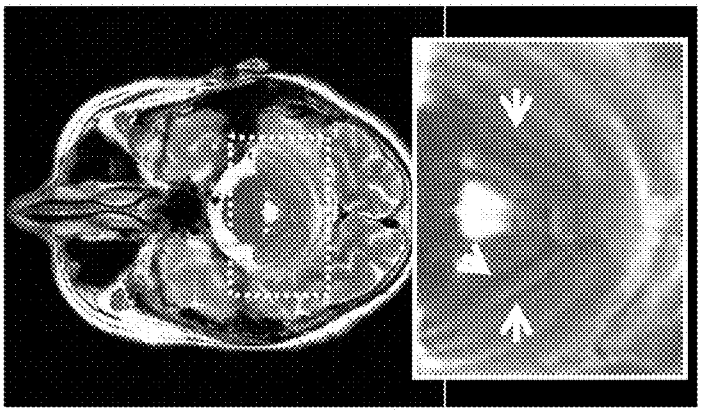
FIG. 8C is a processed image and its enlargement based on the first slice of the MRI brain scan of FIG. 8A in which an MLR having 8 cascaded layers (a) is trained using only soft DC layers and (b) processes the initial reference image using soft and hard DC layers, thereby also producing blurred image areas.
Figure 8B:
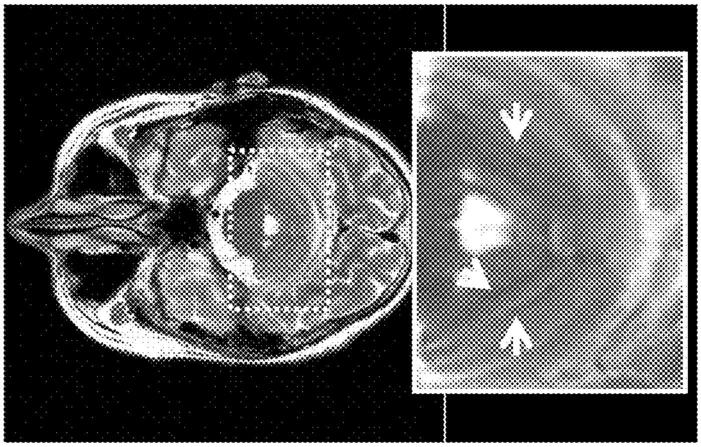
FIG. 8B is a processed image and its enlargement based on the first slice of the MRI brain scan of FIG. 8A in which an MLR having 8 cascaded layers (using only soft DC layers) processes the initial reference image and produces blurred image areas.
Figure 8A:
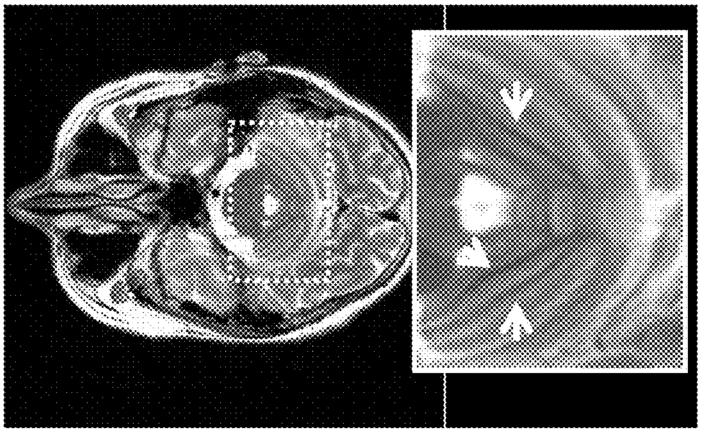
FIG. 8A is an initial reference image of a first slice of an MRI brain scan and an enlarged portion of a central portion of the slice.

FIG. 8A is an initial reference image of a first slice of an MRI brain scan and an enlarged portion of a central portion of the slice. FIG. 8B is a processed image and its enlargement based on the first slice of the MRI brain scan of FIG. 8A in which an MLR having 8 cascaded layers (using only soft DC layers) processes the initial reference image. As noted by the arrows, the processing results in blurred image areas. FIG. 8C is a processed image and its enlargement based on the first slice of the MRI brain scan of FIG. 8A in which an MLR having 8 cascaded layers (a) is trained using only soft DC layers and (b) processes the initial reference image using soft and hard DC layers. As noted by the arrows, the processing also results in blurred image areas.

FIG. 8D is a processed image and its enlargement based on the first slice of the MRI brain scan of FIG. 8A in which an MLR having 8 cascaded layers (a) is trained using soft and hard DC layers and (b) processes the initial reference image using the soft and hard DC layers. As noted by the arrows, the processing results in sharpening of the image and an improved image quality as compared to FIGS. 8B and 8C.

Figure 9D:
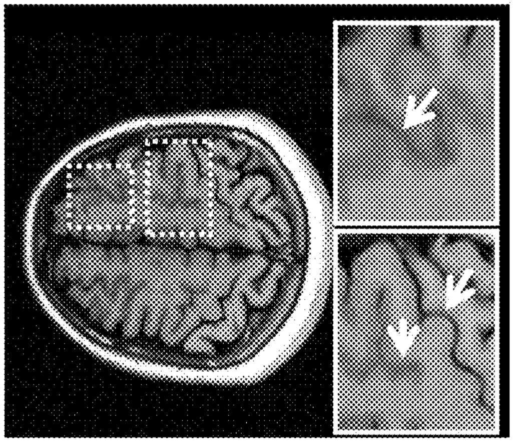
FIG. 9D is a processed image and its enlargements based on the second slice of the MRI brain scan of FIG. 9A in which an MLR having 8 cascaded layers (a) is trained using soft and hard DC layers and (b) processes the initial reference image using the soft and hard DC layers, thereby resulting in improved image quality as compared to FIGS. 9B and 9C.
Figure 9C:
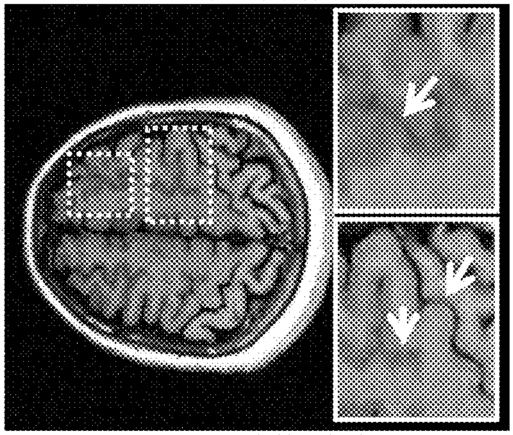
FIG. 9C is a processed image and its enlargements based on the second slice of the MRI brain scan of FIG. 9A in which an MLR having 8 cascaded layers (a) is trained using only soft DC layers and (b) processes the initial reference image using soft and hard DC layers, thereby also resulting in blurred image areas.
Figure 9B:
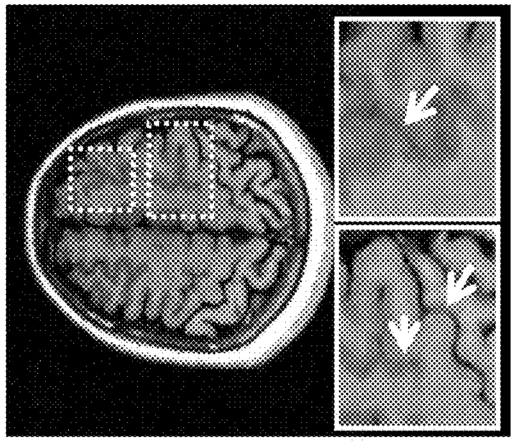
FIG. 9B is a processed image and its enlargements based on the second slice of the MRI brain scan of FIG. 9A in which an MLR having 8 cascaded layers (using only soft DC layers) processes the initial reference image and produces blurred image areas.
Figure 9A:
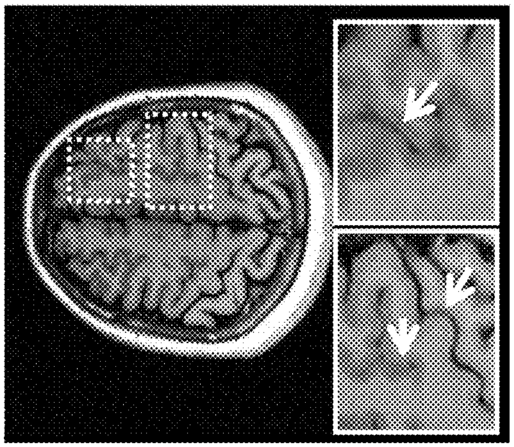
FIG. 9A is an initial reference image of a second slice of an MRI brain scan and two enlarged portions from the second slice.

FIG. 9A is an initial reference image of a second slice of an MRI brain scan and two enlarged portions from the second slice. FIG. 9B is a processed image and its enlargements based on the second slice of the MRI brain scan of FIG. 9A in which an MLR having 8 cascaded layers (using only soft DC layers) processes the initial reference image. As noted by the arrows, the processing results in blurred image areas. FIG. 9C is a processed image and its enlargements based on the second slice of the MRI brain scan of FIG. 9A in which an MLR having 8 cascaded layers (a) is trained using only soft DC layers and (b) processes the initial reference image using soft and hard DC layers. As noted by the arrows, the processing results in blurred image areas.

FIG. 9D is a processed image and its enlargements based on the second slice of the MRI brain scan of FIG. 9A in which an MLR having 8 cascaded layers (a) is trained using soft and hard DC layers and (b) processes the initial reference image using the soft and hard DC layers. As noted by the arrows, the processing results in sharpening of the image and an improved image quality as compared to FIGS. 9B and 9C.

Figure 10D:
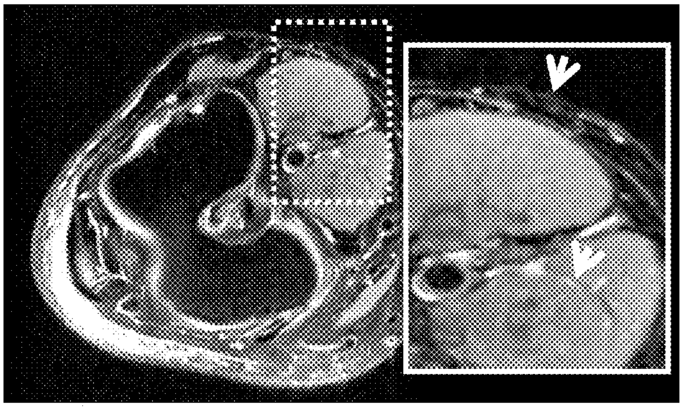
FIGS. 10A-10D are images corresponding to the processing of FIGS. 8A-8D but for a slice of a knee in which the processing of FIG. 10D (using an MLR having 8 cascaded layers (a) trained using soft and hard DC layers and (b) which processes the initial reference image using the soft and hard DC layers) results in improved image quality as compared to FIGS. 10B and 10C.
Figure 10C:
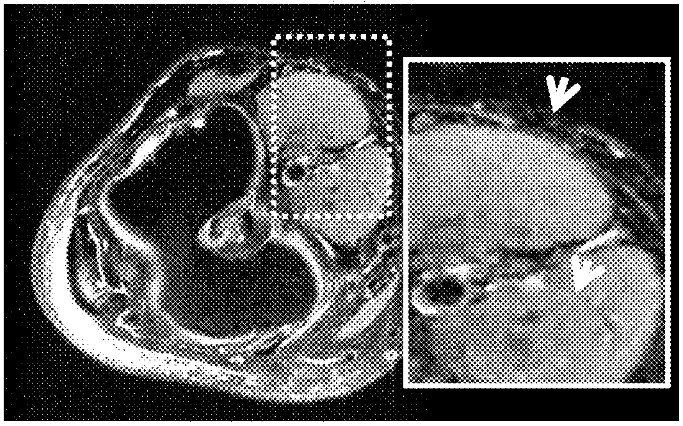
Figure 10B:
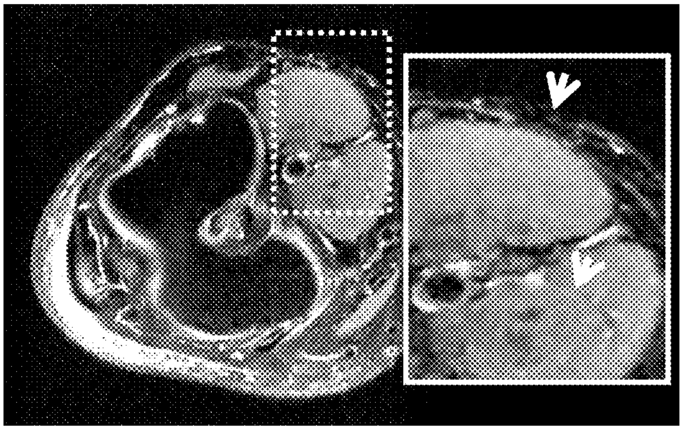
Figure 10A:
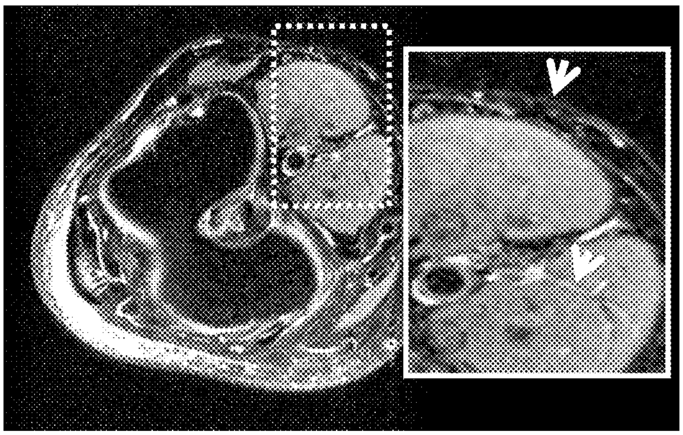

FIGS. 10A-10D are images corresponding to the processing of FIGS. 8A-8D but for a slice of a knee. The processing of FIG. 10D (using an MLR having 8 cascaded layers (a) trained using soft and hard DC layers and (b) which processes the initial reference image using the soft and hard DC layers) results in improved image quality as compared to FIGS. 10B and 10C. The images of FIGS. 10B and 10C are produced by (a) using an MLR only using soft DC and (b) using an MLR having 4 cascaded layers (b1) trained using only soft DC layers and (b2) which processes the initial reference image using soft and hard DC layers, respectively. The arrows show blurriness in FIGS. 10B and 10C compared to relative sharpness in FIG. 10D.

Figure 11D:
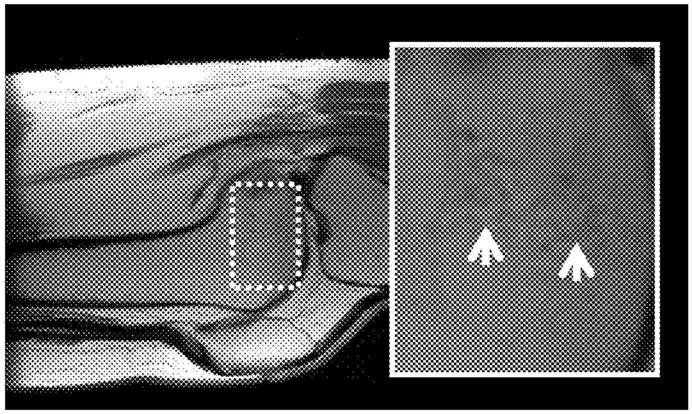
FIGS. 11A-11D are images corresponding to the processing of FIGS. 8A-8D but for a slice of a knee in which the processing of FIG. 11D (using an MLR having 8 cascaded layers (a) trained using soft and hard DC layers and (b) which processes the initial reference image using the soft and hard DC layers) results in improved image quality as compared to FIGS. 11B and 11C.
Figure 11C:
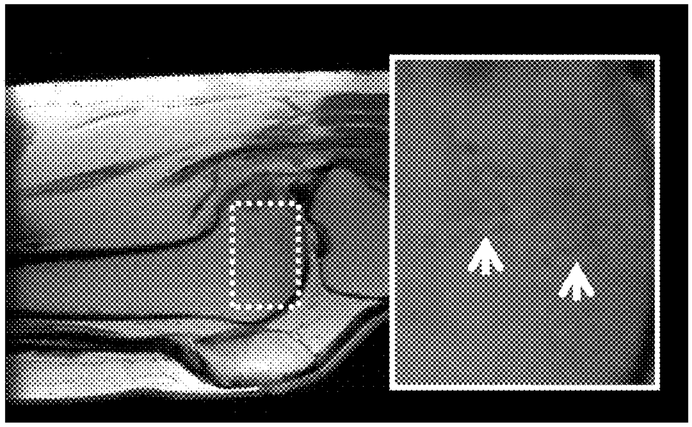
Figure 11B:
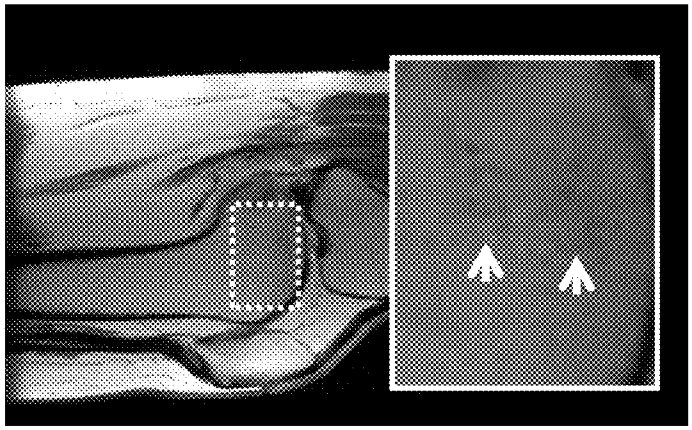
Figure 11A:
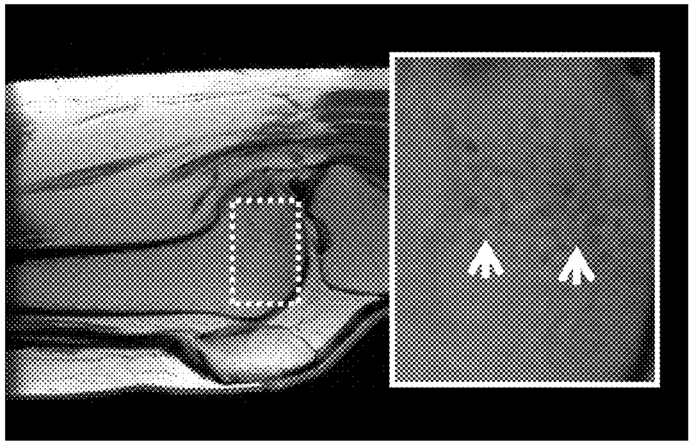

FIGS. 11A-11D are images corresponding to the processing of FIGS. 8A-8D but for a slice of a knee. The processing of FIG. 11D (using an MLR having 8 cascaded layers (a) trained using soft and hard DC layers and (b) which processes the initial reference image using the soft and hard DC layers) results in improved image quality as compared to FIGS. 11B and 11C. The images of FIGS. 11B and 11C are produced by (a) using an MLR only using soft DC and (b) using an MLR having 8 cascaded layers (b1) trained using only soft DC layers and (b2) which processes the initial reference image using soft and hard DC layers, respectively. The arrows show blurriness in FIGS. 11B and 11C compared to relative sharpness in FIG. 11D.

Figure 12A:
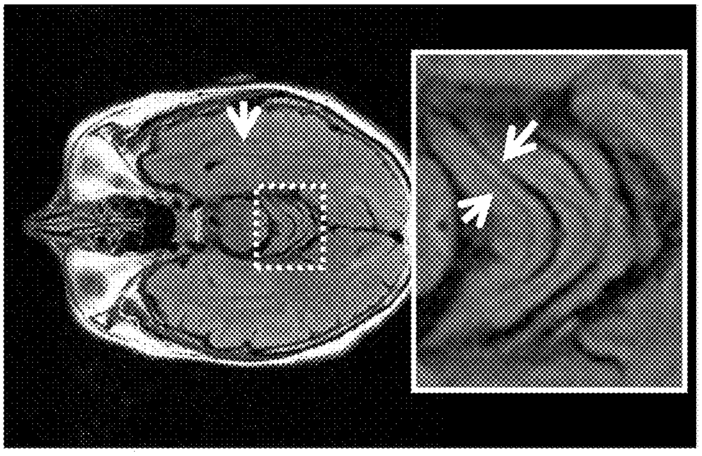
FIGS. 12A-12D are images corresponding to the processing of FIGS. 8A-8D but for a third slice of a brain in which the processing of FIG. 12D (using an MLR having 8 cascaded layers (a) trained using soft and hard DC layers and (b) which processes the initial reference image using the soft and hard DC layers) results in improved image quality as compared to FIGS. 12B and 12C.
Figure 12B:
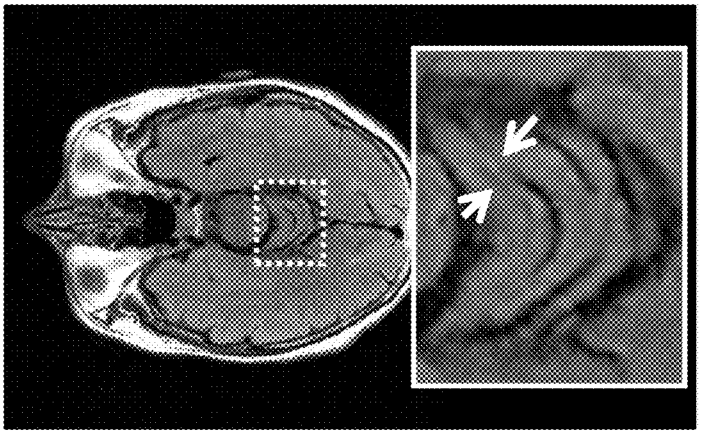
Figure 12C:
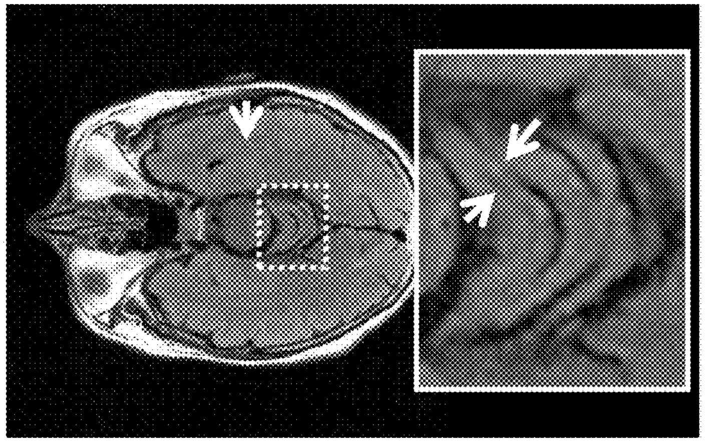
Figure 12D:
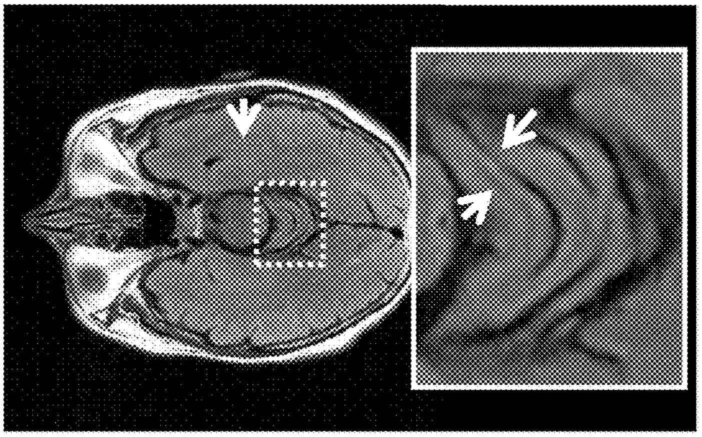

FIGS. 12A-12D are images corresponding to the processing of FIGS. 8A-8D but for a third slice of a brain. The processing of FIG. 12D (using an MLR having 8 cascaded layers (a) trained using soft and hard DC layers and (b) which processes the initial reference image using the soft and hard DC layers) results in improved image quality as compared to FIGS. 12B and 12C. The images of FIGS. 12B and 12C are produced by (a) using an MLR only using soft DC and (b) using an MLR having 8 cascaded layers (b1) trained using only soft DC layers and (b2) which processes the initial reference image using soft and hard DC layers, respectively. The arrows show blurriness in FIGS. 12B and 12C compared to relative sharpness in FIG. 12D.

The methods and systems described herein can be implemented in a number of technologies but generally relate to imaging devices and processing circuitry for performing the processes described herein. In one embodiment, the processing circuitry (e.g., image processing circuitry and controller circuitry) is implemented as one of or as a combination of: an application specific integrated circuit (ASIC), a field programmable gate array (FPGA), a generic array of logic (GAL), a programmable array of logic (PAL), circuitry for allowing one-time programmability of logic gates (e.g., using fuses) or reprogrammable logic gates. Furthermore, the processing circuitry can include a computer processor and having embedded and/or external non-volatile computer readable memory (e.g., RAM, SRAM, FRAM, PROM, EPROM, and/or EEPROM) that stores computer instructions (binary executable instructions and/or interpreted computer instructions) for controlling the computer processor to perform the processes described herein. The computer processor circuitry may implement a single processor or multiprocessors, each supporting a single thread or multiple threads and each having a single core or multiple cores.

Embodiments of the present disclosure may also be as set forth in the following parentheticals.

(1) A method of image processing including, but not limited to: receiving an input image generated using a first set of acquired k-space data including undersampled k-space data; dealiasing the input image to produce a dealiased image; modifying the dealiased image using a first data consistency layer to increase a first data consistency between the dealiased image and an acquired data source thereby producing a first increased data consistency image; and modifying, using a second data consistency layer that receives the undersampled k-space data, the first increased data consistency image to produce a second increased data consistency image in which the second increased data consistency image is constrained to be based on at least a portion of the undersampled k-space data, wherein the first and second data consistency layers are different from each other.

(2) The method according to (1), wherein the undersampled k-space data is undersampled multi-coil k-space data.

(3) The method according to any one of (1)-(2), wherein the undersampled k-space data is non-uniformly sampled, undersampled k-space data.

(4) The method according to any one of (1)-(3), wherein the dealiasing the input image to produce the dealiased image comprises applying the input image to a neural network to produce the dealiased image.

(5) The method according to (4), wherein the dealiasing the input image to produce the dealiased image comprises applying a regularization factor to a result of the neural network to produce the dealiased image.

(6) The method according to any one of (1)-(5), wherein the first data consistency layer comprises a layer performing a gradient descent approach.

(7) The method according to any one of (1)-(5), wherein the first data consistency layer comprises a layer performing proximal mapping based on a conjugate gradient.

(8) The method according to any one of (1)-(5), wherein the first data consistency layer comprises a layer performing variable splitting.

(9) The method according to any one of (1)-(8), wherein the acquired data source is at least one of (1) a portion of the first set of acquired k-space data, (2) a function of at least a portion of the first set of acquired k-space data or (3) an artifact corrected first set of acquired k-space data.

(10) The method according to (9), wherein the acquired data source comprises an auto-calibration signal included in the first set of acquired k-space data.

(11) The method according to (9), wherein the function of the at least a portion of the first set of acquired k-space data comprises a transformation of the at least a portion of the first set of acquired k-space data.

(12) The method according to (1), wherein the second data consistency layer comprises a hard data consistency layer.

(13) The method according to (12), wherein the hard data consistency layer includes, but is not limited to, a layer in which at least one value of the undersampled k-space data replaces a corresponding k-space value in a k-space representation of the first increased data consistency image.

(14) The method according to any one of (1)-(13), wherein the dealiasing, the modifying the dealiased image, and the modifying using the second data consistency layer are performed N times in succession by N cascades, wherein N is an integer greater than 1.

(15) The method according to (14), wherein the N cascades comprise N neural networks.

(16) The method according to any one of (1)-(15), wherein the second increased data consistency image is constrained to be based on a blending of (1) at least the portion of the undersampled k-space data and (2) the first increased data consistency image using a blending ratio.

(17) An apparatus for performing image processing, including, but not limited to: processing circuitry configured to perform the method of any one of (1)-(16).

(18) A non-transitory computer-readable storage medium storing computer-readable instructions that, when executed by a computer, cause the computer to perform an image processing method according to any one of (1)-(16).

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method of image processing comprising:

receiving an input image generated using a first set of acquired k-space data including undersampled k-space data;

dealiasing the input image to produce a dealiased image;

modifying the dealiased image using a first data consistency layer to increase a first data consistency between the dealiased image and an acquired data source thereby producing a first increased data consistency image; and modifying, using a second data consistency layer that receives the undersampled k-space data, the first increased data consistency image to produce a second increased data consistency image in which the second increased data consistency image is constrained to be based on at least a portion of the undersampled k-space data, wherein the first and second data consistency layers are different from each other.

2. The method according to claim 1, wherein the undersampled k-space data is undersampled multi-coil k-space data.

3. The method according to claim 1, wherein the undersampled k-space data is non-uniformly sampled, undersampled k-space data.

4. The method according to claim 1, wherein the dealiasing the input image to produce the dealiased image comprises applying the input image to a neural network to produce the dealiased image.

5. The method according to claim 4, wherein the dealiasing the input image to produce the dealiased image comprises applying a regularization factor to a result of the neural network to produce the dealiased image.

6. The method according to claim 1, wherein the first data consistency layer comprises a layer performing a gradient descent approach.

7. The method according to claim 1, wherein the first data consistency layer comprises a layer performing proximal mapping based on a conjugate gradient.

8. The method according to claim 1, wherein the first data consistency layer comprises a layer performing variable splitting.

9. The method according to claim 1, wherein the acquired data source is at least one of (1) a portion of the first set of acquired k-space data, (2) a function of at least a portion of the first set of acquired k-space data or (3) an artifact corrected first set of acquired k-space data.

10. The method according to claim 9, wherein the acquired data source comprises an auto-calibration signal included in the first set of acquired k-space data.

11. The method according to claim 9, wherein the function of the at least a portion of the first set of acquired k-space data comprises a transformation of the at least a portion of the first set of acquired k-space data.

12. The method according to claim 1, wherein the second data consistency layer comprises a hard data consistency layer.

13. The method according to claim 12, wherein the hard data consistency layer comprises a layer in which at least one value of the undersampled k-space data replaces a corresponding k-space value in a k-space representation of the first increased data consistency image.

14. The method according to claim 1, wherein the dealiasing, the modifying the dealiased image, and the modifying using the second data consistency layer are performed N times in succession by N cascades, wherein N is an integer greater than 1.

15. The method according to claim 14, wherein the N cascades comprise N neural networks.

16. The method according to claim 1, wherein the second increased data consistency image is constrained to be based on a blending of (1) at least the portion of the undersampled k-space data and (2) the first increased data consistency image using a blending ratio.

17. An apparatus for performing image processing, comprising:

processing circuitry configured to:

receive an input image generated using a first set of acquired k-space data including undersampled k-space data;

dealias the input image to produce a dealiased image;

modify the dealiased image using a first data consistency layer to increase a first data consistency between the dealiased image and an acquired data source thereby producing a first increased data consistency image; and modify, using a second data consistency layer that receives the undersampled k-space data, the first increased data consistency image to produce a second increased data consistency image in which the second increased data consistency image is constrained to be based on at least a portion of the undersampled k-space data, wherein the first and second data consistency layers are different from each other.

18. A non-transitory computer-readable storage medium storing computer-readable instructions that, when executed by a computer, cause the computer to perform an image processing method, comprising:

receiving an input image generated using a first set of acquired k-space data including undersampled k-space data;

dealiasing the input image to produce a dealiased image;

modifying the dealiased image using a first data consistency layer to increase a first data consistency between the dealiased image and an acquired data source thereby producing a first increased data consistency image; and modifying, using a second data consistency layer that receives the undersampled k-space data, the first increased data consistency image to produce a second increased data consistency image in which the second increased data consistency image is constrained to be based on at least a portion of the undersampled k-space data, wherein the first and second data consistency layers are different from each other.

* * * * *